May 29, 1956     A. W. RUSSELL     2,748,048
PLASTIC STRUCTURAL MEMBER
Filed March 30, 1954     2 Sheets-Sheet 1
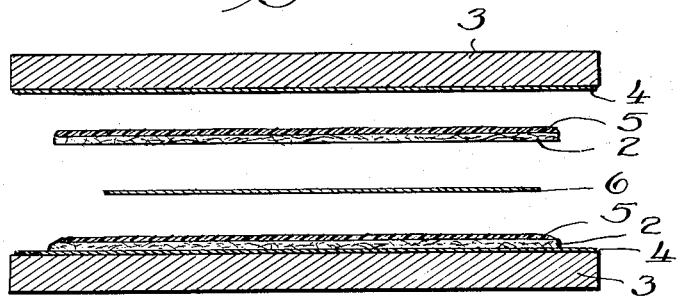
Fig. 1
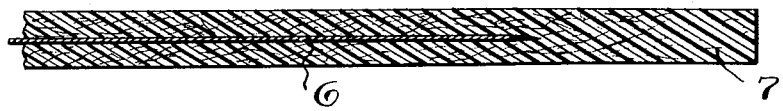
Fig. 2
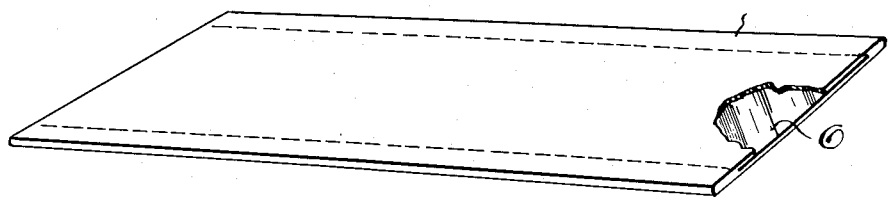
Fig. 3
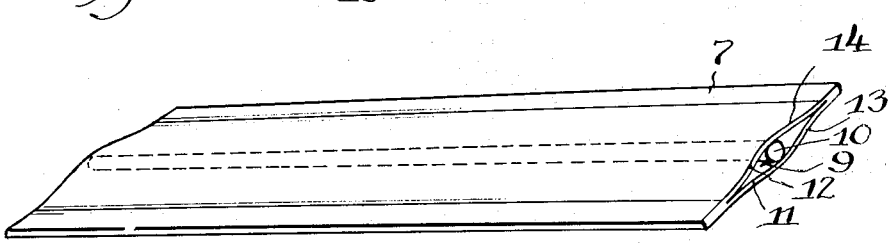
Fig. 4
Fig. 5
Inventor,
Alfred W. Russell
By: Schneider & Dressler
Attys.

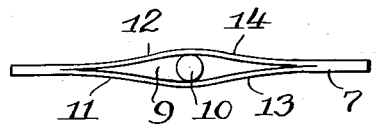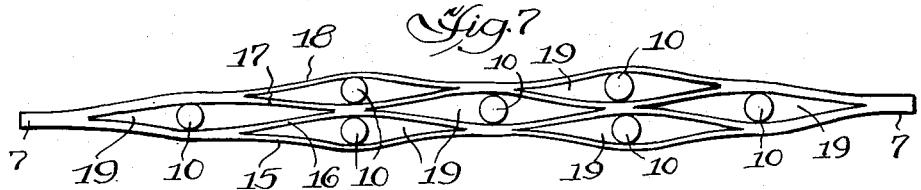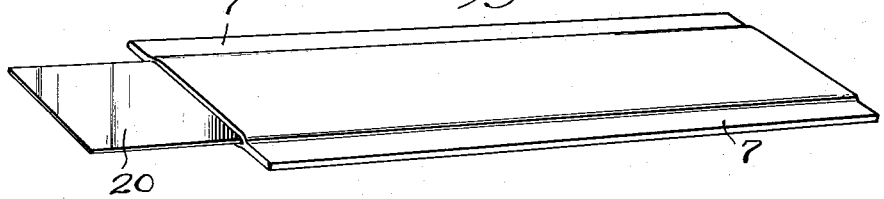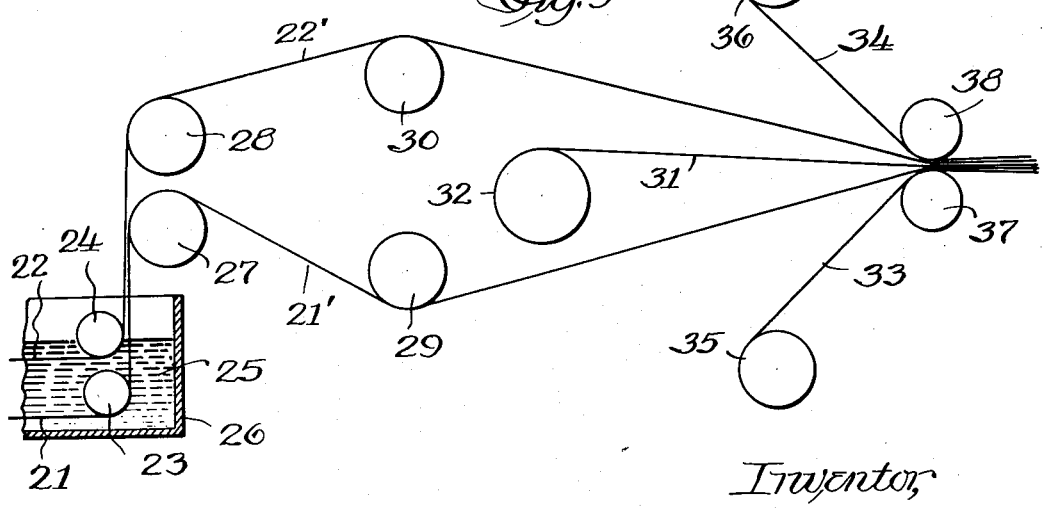

United States Patent Office 2,748,048
Patented May 29, 1956

2,748,048

PLASTIC STRUCTURAL MEMBER

Alfred W. Russell, Farmingdale, N. Y., assignor to Russell Reinforced Plastics Corporation, a corporation of New York Application March 30, 1954, Serial No. 419,720

19 Claims. (Cl. 154—116)

This invention relates to plastic structural members, particularly to reinforced plastic structural members and to methods of making the same.

Plastic or reinforced plastic sheet products having light transmitting qualities, high strength-weight ratios, impact resistance and ease of workability are desirable as durable, permanently colored members of varied structural and ornamental value in the building construction field as louvers, jalousies, wall panels, door panels, patio and other roofing members, shower stall panels, and similar articles, particularly where light and/or ventilation control is desired. The plastic structural members of the present invention have these desirable characteristics and are suitable for the uses named as well as other uses in the building construction and other fields.

The use of plastic or reinforced plastic sheet products in the building materials field has heretofore been seriously restricted because of the low modulus of deflection of such products, even when reinforced in manners known to the art. The present invention contemplates bonding and curing two or more sheets of plastic material into a form that will increase the modulus of deflection far beyond the increase that occurs naturally from the additional thickness of plastic material, and will provide a member of great strength and dimensional stability which has sufficient rigidity to permit its use as a structural member.

In accordance with the invention, two or more superposed thicknesses of plastic material capable of polymerizing and/or curing to a rigid, solid state, either with or without fiber reinforcement, preferably with, are bonded together only at their contiguous lateral edges and cured. Any thermosetting resin such as a liquid, polymerizable, resinous material capable of curing to a rigid, solid, resinous state may be used. If the resin used is one which will adhere to metal, the mold in which laminating and curing is effected is preliminarily coated with a suitable mold release agent to prevent adherence of the resin thereto, in accordance with conventional procedures. The center portion of the layers of plastic material, throughout the length thereof, are kept from adhering by the use of a separating sheet which will not dissolve in the resin and to which the resin will not adhere, or will adhere to only an insubstantial extent. The separating sheet may be removed, but if it is transparent or translucent, such as cellophane, for example, it may remain in place without adverse effect on the finished product. A rod, or other reinforcing member, of any suitable form is inserted into the space between the non-adhered areas of the laminate to provide reinforcement and to impart great structural strength thereto. The rod is preferably of transparent plastic material, such as polystyrene, for example, but may be of metal, wood, glass, or other suitable material. Glass is not desirable where the member is subject to impact.

The structure by means of which the above and other advantages of the invention are attained, and the various materials that may be used in the manufacture of the structural member, will be fully described in the following specification, taken in conjunction with the accompanying drawing showing preferred illustrative embodiments of the invention, in which:

Fig. 1 is a diagrammatic view of the arrangement of the various components in one method of making the laminate and providing the lengthwise non-adhered area or pocket therein;

Fig. 2 is a fragmentary cross sectional view through the laminate;

Fig. 3 is a perspective view of the laminate;

Fig. 4 is a perspective view of the reinforcing rod;

Fig. 5 is a perspective view of the structural member with the reinforcing rod within the pocket of the laminate;

Fig. 6 is an end view of the structural member;

Fig. 7 is an end view of another form of structural member embodying the invention;

Fig. 8 is a view illustrating another method of forming the pocket within the laminate; and Fig. 9 is a diagrammatic view illustrating a continuous method of forming the laminate.

In a preferred form of the invention a layer 2 of fiber is laid on a plate 3 having a smooth, flat surface which may be treated to keep the resin from adhering thereto. The plate forms the bottom wall of a mold. As illustrated, the mold is an open mold, but it may be a closed mold, if desired. The smooth, flat surface of plate 3 may be polished metal, but I prefer to apply a sheet 4 of cellophane or similar material to which the resin will not adhere during curing, on the metal plate and place the fiber on the cellophane sheet. Examples of other materials which may be used are polyvinyl alcohol film, wax lubricating material such as silicone resin compounds, and other mold release agents conventionally used in the resin molding art. The area of the sheet 4 of cellophane or like material is preferably larger than the area of the layer of fiber, for a reason hereinafter disclosed.

Various types of fiber which have proved to be satisfactory include nonorganic fibers such as glass fiber, commercially available under the trademark "Fiberglas," natural fiber such as hogs hair, and synthetic fiber such as nylon, rayon, acrylic fiber (a copolymer of vinyl chloride and acrylonitrile) commercially available under the trademark "Dynel," acrylic fiber (formed from a polymer of acrylonitrile) commercially available under the trademark "Orlon," and polyvinylidene chloride-polyvinyl chloride copolymer fiber commercially available under the trademark "Saran." The fibers may be mixed, or may be of a single kind, and may be woven or non-woven. Ordinarily the fiber sheet or mat is in the form of a single layer, but a multiplicity of layers may be used, if desired.

A suitable resin 5 is then poured on the fiber mat to impregnate the same and/or fill the interstices thereof. Although a thermoplastic resin may be used, it is preferred to use any thermosetting resin in a viscous liquid state, such as a partially polymerized resinous liquid material capable of curing to a rigid, solid resinous state. Examples of such thermosetting resins are epoxy resins which are presently solid by Ciba Company, Inc. under the trademark "Araldite" and by Shell Chemical Corp. under the trademark "Epon." These resins have a tendency to adhere to metal during curing, but not if the metal is coated with wax, lubricating material or other mold release agents conventionally used in the resin molding art. Other desirable thermosetting resins which may be used in accordance with the invention are polymerizable unsaturated alcohol polyesters of polybasic acids such as phthalic, terephthalic, oxalic, carbonic, succinic, sebacic, azelaic and adipic acids, including diallyl oxalate, diallyl carbonate, diallyl succinate, diallyl adipate, diallyl maleate, diallyl fumarate, diallyl itaconate, ethylene glycol bis (allyl carbonate), diethylene glycol bis (allyl carbonate), and mixtures thereof. Still other desirable resins are polymerizable unsaturated alcohol esters of unsaturated acids such as the esters of vinyl, allyl, methallyl, beta ethyl allyl, crotyl, propargyl, methyl propargyl, phenyl propargyl, oleyl, linoleyl, ricinoleyl, or cinnamyl alcohol and unsaturated acids such as acrylic, methacrylic, alpha or beta chloracrylic, crotonic or cinnamic acids, including allyl acrylate, allyl alpha chloracrylate, etc.

And still other desirable thermosetting resins are polyhydric alcohol esters of unsaturated acids such as acrylic, methacrylic, alpha or beta chloracrylic, fumaric, maleic, itaconic, crotonic, etc. and polyhydric alcohols such as ethylene glycol, diethylene glycol, triethylene glycol, hexa-ethylene glycol, propylene glycol, dipropylene glycol, glycerol, sorbitol, and mannitol, including ethylene glycol diacrylate, etc.

Polyhydric alcohol polyesters of polybasic acids are also desirable thermosetting resins which may be used in accordance with the present invention. These include esters of the above mentioned polyhydric alcohols, and maleic, itaconic, citraconic, or fumaric acids. Such esters may include alkyds such as ethylene glycol maleate or fumarate or compounds such as ethylene glycol bis (ethylene fumarate), etc., and esters formed by the reaction of polyhydric alcohol-unsaturated dibasic acid esters having an acid number below 150 with a monohydric alcohol such as methyl, ethyl or propyl alcohol in an amount sufficient to reduce the viscosity, and the monobasic reaction products thereof, as described in Patent No. 2,418,633 issued to Charles Gould.

It is also possible to use polymerizable ethers including divinyl ether, etc. and copolymers of the ethers and any of the above compounds, or other organic compounds containing two or more unsaturated, unconjugated groups, including divinyl naphthalene, divinyl benzene, divinyl acetylene, vinyl acetylene, etc.

Glycerol phthalate, liquid phenol-aldehyde resins, melamine-aldehyde condensation products and urea condensation products, alone or in admixture with the above compounds containing one or more polymerizable groups are additional examples of liquid polymerizable or condensible materials capable of curing to a thermosetting state which may also be used.

Solid or semi-solid polymerizable resinous compositions may be dissolved in polymerizable liquids or in plasticizers to provide the necessary fluidity. Liquid compositions that are too fluid to be used may be partially polymerized or may be blended with more viscous materials to attain the desired viscosity for impregnating the fiber mat. Such fluid compositions may be partially polymerized with heat in the presence of catalysts such as benzoyl peroxide, acetone peroxide, lauroyl peroxide, or methyl ethyl ketone peroxide. For example, diallyl phthalate containing 5 percent by weight of benzoyl peroxide may be heated at 80 to 85° C. in a flask provided with a glass tube having two spaced marks. The diallyl phthalate is drawn up in the tube and allowed to flow back, the time required for the liquid to flow between the two marks being observed with a stop watch. The liquid is stirred during the heating, and when the time for the flow between the two marks increases to 15 times the initial time required at the beginning of the heating period, the composition is sufficiently viscous for use in accordance with the invention and may be cooled to room temperature.

After the fiber mat has been thoroughly impregnated and covered with resin, a strip 6 of cellophane or similar material that will not adhere to the resin when it is cured, of less width than the fiber mat, is placed centrally on top of the impregnated fiber mat and then an additional layer 2 of fibers is superimposed over the impregnated mat and the cellophane. Another application of resin 5 is poured over the second layer of fiber to impregnate and cover it. If additional thickness is desired the process may be repeated, with or without the inner strip of cellophane, depending on the pocket structure desired. Strip 6 is of at least the same length as the layers of fiber but is of less width and is centrally disposed with respect to the longitudinal edges of the fiber layers, so that when the mass is cured the longitudinal edges of the resin-impregnated layers will be bonded together, and the central portion coincident with the area of the cellophane strip will be separated to form an open ended pocket. Another plate 3 is placed over the uppermost layer of resin-impregnated fibers, with a sheet 4 of cellophane or similar material interposed between the resin and the smooth, flat surface of the plate. The weight of the upper plate, with the addition of pressure if required, will squeeze any excess resin from the layers of fiber to the sides of the fibers and between the overlapping cellophane sheets to provide beads of resinous material laterally of the laminate which seal the same against entry of air during the curing process. The projecting areas of cellophane sheets 4 preferably are sufficiently extensive to prevent any of the excess resin from coming in contact with plates 3. Plates 3 may be part of a mold, or may be placed in a suitable mold, and the mold may then be treated to cure the resin if heating is required for curing. The mold may be cooled to set the resin where the resin is a liquefied thermoplastic resin.

Although the resin has been described as being used in connection with layers of fiber, and such construction is preferred, because of the reinforcing value of the fiber, it should be understood that the fiber may be omitted, and the structural member made entirely of plastic material. Many plastic materials, when fabricated in accordance with my invention, provide structural members having sufficient strength for their intended use without the additional reinforcement afforded by fiber.

The curing or setting of the resin, with or without the fiber reinforcement, may be effected without applied pressure, depending only on the weight of the upper plate 3 and/or the top of the mold, or with an applied pressure of up to about 300 pounds per square inch. Higher pressures can be used, if desired, but with the polymerizable resins presently available this is not necessary. For example, using a viscous, liquid, polymerizable type of resin, such as ethylene glycol maleate alkyd, I prefer to effect the curing of the resin at zero pounds applied pressure or low applied pressures up to about 250 pounds per square inch.

The curing bonds the resin and fiber into a unitary structure having a single thickness, indicated at 7, Fig. 3, separated only along its central longitudinal area contiguous to cellophane sheet 6 to form an open ended pocket 9 extending longitudinally of the unit. When the unit is removed from the mold after curing, cellophane sheet 6 may be removed, but is preferably left in place because, being transparent, it does not detract from the appearance of the finished product.

A reinforcing member 10 is inserted into pocket 9. The reinforcing member may be in the form of a rod, tube or channel, or other elongated structural form. It may be of metal, wood, plastic, glass, etc. Glass is not desirable where the resulting article is subject to impact because of the possibility of breakage of the reinforcing member. The reinforcing member is preferably made of plastic material. Transparent or translucent plastic materials such as polystyrene are especially preferred because with glass fibers and a transparent or translucent impregnating resin, the reinforcing rod or the like is not very noticeable in the finished product.

The insertion of reinforcing member 10 into pocket 9 stretches the separated portions of the plastic sheets and puts them under tension. The reinforcing member 10 causes the separated portions of the plastic sheets to assume the shape of "Witch of Agnesi" curves 11, 12, 13 and 14 which serve to provide a structure of great strength and rigidity to make the product useful as a structural member wherever resistance to twisting is necessary. The laminate without the reinforcing member twists readily. The reinforced laminate is very resistant to twisting.

In Fig. 7 I have illustrated a structural member formed of four layers 15, 16, 17 and 18 of plastic, or plastic reinforced with fiber, and provided with a multiplicity of pockets 19. It will be obvious that pockets 19 may have any desired relationship, depending upon the positioning of the strips of cellophane or the like before the mass is cured. The only necessary restriction is that the longitudinal edges and such intermediate portions as may be required to form the pockets must be free of interposed cellophane in order to bond the layers together when the mass is cured. The reinforcing members 10 are illustrated as being rods of uniform diameter, but it should be understood that they may be of any desired shape, and may be of different thicknesses. For example, rods 10 in Fig. 7 that are substantially superimposed may be semi-circular in cross section so as to make the longitudinal central portion of the member of substantially uniform thickness.

In Fig. 8 the strip 6 of cellophane is replaced by a strip 20 of polished metal which may be coated with wax, lubricating material or any other mold release agent conventionally used in the resin molding art. Strip 20 is longer and narrower than the plastic layers, and is removed after the curing operation to leave a pocket similar to pocket 9 except that no cellophane or similar material is left therein.

In Fig. 9 I have diagrammatically illustrated apparatus which may be used to form the structural member of the present invention in a continuous form. The members are then severed transversely into any desirable lengths. In this process fiber strips 21, 22 are passed under rollers 23, 24 immersed in liquid resin 25 contained in a tank 26. The resin impregnated strips 21', 22' are then passed over rollers 27, 28 positioned over tank 26 so that any excess resin will drip back into the tank. The resin impregnated strips are then separated a considerable distance by rollers 29, 30 so that a strip 31 of cellophane or similar material taken from a reel 32, may be interposed between strips 21' and 22'. Strip 31 is narrower than strips 21' and 22' and is fed therebetween centrally thereof. Additional strips 33 and 34 of cellophane or similar material taken from reels 35 and 36, respectively, of greater width than strips 21' and 22' are applied against the outer surfaces of strips 21' and 22' as they enter the bight between rollers 37 and 38. Any excess resin that may be present at this point is squeezed out onto the projecting overlapping portions of strips 33 and 34. Rollers 37 and 38 may be heated to effect curing of the resin as it passes these rolls, or the composite strip may be fed from rollers 37, 38 to any suitable curing apparatus. It will be understood that although the apparatus of Fig. 9 is arranged for only two layers of plastic or fiber reinforced plastic, additional rollers may be provided to form a structural member having more than two layers, if desired. The structural member formed by the continuous process is cut into suitable lengths, and a reinforcing member 10 is inserted in each pocket the same as in the previously described embodiments.

Although I have described several preferred embodiments of my invention in considerable detail, it will be understood that the description thereof is intended to be illustrative, rather than restrictive, as many details of the structure may be modified or changed without departing from the spirit or scope of the invention. Accordingly, I do not desire to be restricted to the exact construction described.

I claim:

1. A plastic structural member comprising a laminate of plastic material bonded together along its longitudinal edge portions and provided with a longitudinally extending pocket in its center portion, and a reinforcing member positioned lengthwise in said pocket to separate said center portions.

2. A plastic structural member comprising a laminate of plastic material bonded together along its longitudinal edge portions with its longitudinally extending center portion separated, the plastic material defining said longitudinally extending center portion being separated and curved transversely by a reinforcing member positioned lengthwise substantially throughout the length of said laminate.

3. A plastic structural member comprising a laminate of plastic material bonded together along its longitudinal edge portions with its longitudinally extending center portion separated, the plastic material defining said longitudinally extending center portion being separated and curved transversely by a reinforcing member positioned lengthwise substantially throughout the length of said laminate and centrally thereof.

4. A plastic structural member comprising a laminate of plastic material bonded together along its longitudinal edge portions with its longitudinally extending center portion separated, the plastic material defining said longitudinally extending center portion being separated and curved symmetrically from the longitudinal center to each longitudinal edge of said laminate to provide increased resistance to deflection.

5. A plastic structural member comprising a laminate of plastic material bonded together along its longitudinal edge portions and provided with a longitudinally extending pocket in its center portion, and a reinforcing member positioned lengthwise in said pocket to separate said center portions, the maximum separation being along the longitudinal center line, and said separated portions each being curved symmetrically along transverse lines sweeping from said point of maximum separation towards said bonded longitudinal edge portions to provide increased resistance to deflection.

6. A plastic structural member comprising a laminate of plastic material bonded together along its longitudinal edge portions and provided with a longitudinally extending open ended pocket in its center portion, and a reinforcing member positioned lengthwise in said pocket, said reinforcing member keeping the plastic material of said center portion under tension.

7. A plastic structural member comprising a laminate of plastic material bonded together along a plurality of longitudinally extending areas, a plurality of longitudinally extending pockets, the opposite longitudinal edges of each of said pockets being each defined by one of said bonded areas, and a reinforcing member positioned lengthwise in each of said pockets, each of said reinforcing members curving the plastic material of its pocket transversely to increase the resistance of said structural member to deflection.

8. A plastic structural member comprising a laminate of thermoset plastic material bonded together only along its longitudinal edge portions and thereby providing an unbonded longitudinally extending center portion, and a reinforcing member positioned in said center portion to curve the plastic material transversely between said bonded edges and thereby increase the resistance of said structural member to deflection.

9. A plastic structural member comprising a laminate of thermoset plastic material bonded together along its longitudinal edge portions and with its longitudinally extending center portion free of bonding adherence, and a transparent reinforcing member positioned lengthwise in said center portion to curve the plastic material transversely between said bonded edges and thereby increase the resistance of said structural member to deflection.

10. The method of forming a plastic structural member which comprises the steps of superimposing two layers of resin with a strip of material non-adherent to said resin of less width than said layers of resin interposed therebetween, said layers of resin extending beyond the longitudinal edges of said non-adherent strip, bonding the longitudinal edges of said resinous layers together with a pocket extending longitudinally between said bonded edge portions, separating said pocket portions, and curving them symmetrically from the longitudinal center thereof to each longitudinal edge of said laminate.

11. The method of forming a plastic structural member which comprises the steps of superimposing two layers of a polymerizable resin with a strip of material non-adherent to said resin and of less width than said layers of resin interposed therebetween, positioning a sheet of material non-adherent to said resin adjacent the outer surface of each of said layers of resin, said layers of resin extending beyond the longitudinal edges of said non-adherent strip, each of said non-adherent sheets extending beyond each edge of said layers of resin, curing said resin to bond the longitudinal edges of said resinous layers together and form a pocket extending longitudinally between said bonded edge portions, and inserting a reinforcing member in said pocket to separate said pocket portions and curve them transversely from the longitudinal center toward said bonded edge portions.

12. The method of forming a plastic structural member which comprises placing a layer of fiber on a sheet of material non-adherent to resin with the sheet of non-adherent material extending beyond each edge of said layer of fiber, impregnating said fiber with a liquid, polymerizable resin, placing a strip of material non-adherent to resin over said resin, said layer of resin and fiber extending beyond the longitudinal edges of said strip and said strip extending at least to each of the other edges of said layer of resin and fiber, superimposing another layer of fiber on said layer of resin and fiber and said non-adherent strip, impregnating said last mentioned layer of fiber with a liquid, polymerizable resin, placing another sheet of material non-adherent to resin over said last mentioned layer of resin and fiber with its edges extending beyond each edge thereof, curing said mass to bond the longitudinal edges of said layers of resin and fiber with a pocket defined by said strip of material non-adherent to resin extending longitudinally between said bonded edges, separating said pocket portions, and curving them symmetrically from the longitudinal center thereof to each longitudinal edge of said laminate.

13. The method of forming a plastic structural member which comprises placing a layer of fiber on a sheet of material non-adherent to resin with the sheet of non-adherent material extending beyond each edge of said layer of fiber, impregnating said fiber with a liquid polymerizable resin, placing a strip of material non-adherent to resin over said resin, said layer of resin and fiber extending beyond the longitudinal edges of said strip and said strip extending at least to each of the other edges of said layer of resin and fiber, superimposing another layer of fiber on said layer of resin and fiber and said non-adherent strip, impregnating said last mentioned layer of fiber with a liquid polymerizable resin, placing another sheet of material non-adherent to resin over said last mentioned layer of resin and fiber with its edges extending beyond each edge thereof, curing said mass to bond the longitudinal edges of said layers of resin and fiber with a pocket defined by said strip of material non-adherent to resin extending longitudinally between said bonded edges, and inserting a reinforcing member in said pocket to separate said pocket portions and curve them transversely from the longitudinal center toward said bonded edge portions.

14. The method of forming a plastic structural member which comprises interposing a narrow strip of material non-adherent to resin between layers of fiber reinforced thermosetting resin and curing the fiber reinforced resin to a thermoset state to bond opposite longitudinal edges of said resin together, and inserting a reinforcing member between the layers of fiber reinforced resin in the area defined by said non-adherent strip to separate said layers of fiber reinforced resin between said bonded edges and to curve them symmetrically in a transverse direction.

15. The method of forming a plastic structural member which comprises the steps of superimposing two layers of a fibrous material impregnated with a liquid polymerizable resinous material capable of being cured to a solid, rigid state with a strip of material non-adherent to said resinous material and of less width than said fibrous impregnated layers interposed therebetween, said fibrous impregnated layers extending beyond the longitudinal edges of said non-adherent strip, and curing said resinous material to a solid, rigid state to bond the longitudinal edges of said fibrous layers together with a pocket extending longitudinally between said bonded edges, and inserting a longitudinally extending reinforcing member lengthwise in said pocket to separate said pocket portions and curve them transversely from the longitudinal center towards said longitudinal edge portions.

16. The method of forming a plastic structural member which comprises the steps of superimposing two layers of a fibrous material impregnated with a liquid polymerizable resinous material capable of being cured to a solid, rigid state with a strip of cellophane of less width than said fibrous impregnated layers interposed therebetween, said fibrous impregnated layers extending beyond the longitudinal edges of cellophane, and curing said resinous material to a solid, rigid state to bond the longitudinal edges of said fibrous layers together with a pocket extending longitudinally between said bonded edges and inserting a longitudinally extending reinforcing member lengthwise in said pocket to separate said pocket portions and curve them transversely from the longitudinal center towards said longitudinal edge portions.

17. A plastic structural member comprising a laminate of fiber reinforced plastic material bonded together along its longitudinal edge portions and provided with a longitudinally extending pocket in its center portion, and a reinforcing rod positioned lengthwise in said pocket to separate said center portions and to hold them under tension to provide increased resistance to deflection.

18. A plastic structural member comprising a laminate of fiber reinforced plastic material bonded together along its longitudinal edge portions, each of said bonded areas terminating along a longitudinal line spaced from the longitudinal center line of said laminate to provide a longitudinally extending unbonded center portion, the plastic material defining the unbonded center portion being separated and curved transversely by a reinforcing rod positioned lengthwise substantially throughout the length of said laminate and centrally thereof.

19. A plastic structural member comprising a laminate of fiber reinforced plastic material bonded together along a plurality of longitudinally extending areas, a longitudinally extending pocket having each of its longitudinal edges defined by one of said bonded areas, and a reinforcing rod positioned lengthwise in said pocket, said rod keeping the plastic material of said pocket under tension.

References Cited in the file of this patent

UNITED STATES PATENTS

| Number | Name | Date |
|---|---|---|
| 1,191,765 | Crumbaugh | July 18, 1916 |
| 1,359,919 | Reardon | Nov. 23, 1920 |
| 2,294,796 | Moulder | Dec. 31, 1940 |
| 2,608,502 | Merriman | Aug. 26, 1952 |